(12) United States Patent
Lee et al.

(10) Patent No.: US 11,580,958 B2
(45) Date of Patent: Feb. 14, 2023

(54) METHOD AND DEVICE FOR RECOGNIZING SPEECH IN VEHICLE

(71) Applicants: HYUNDAI MOTOR COMPANY, Seoul (KR); KIA MOTORS CORPORATION, Seoul (KR)

(72) Inventors: Kyung Chul Lee, Seongnam-si (KR); Young Jae Park, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 240 days.

(21) Appl. No.: 17/015,792

(22) Filed: Sep. 9, 2020

(65) Prior Publication Data
US 2021/0343275 A1 Nov. 4, 2021

(30) Foreign Application Priority Data
Apr. 29, 2020 (KR) .................. 10-2020-0052404

(51) Int. Cl.
*G10L 15/08* (2006.01)
*G10L 25/51* (2013.01)
(Continued)

(52) U.S. Cl.
CPC .......... *G10L 15/08* (2013.01); *B60R 11/0247* (2013.01); *G06F 3/013* (2013.01);
(Continued)

(58) Field of Classification Search
CPC . B60N 2/002; B60R 11/0247; B60R 11/0373; B60R 16/0373; G06F 3/013; G06F 3/017; G06F 3/04817; G06F 3/16; G06F 3/167; G06F 2203/0381; G06F 3/0346; G06F 9/46; G06F 16/433; G06F 40/174; G06V 20/597; G06V 40/28; G08G 1/0962; G10L 15/02; G10L 15/07; G10L 15/08; G10L 15/20; G10L 15/22; G10L 15/28; G10L 25/51; G10L 2015/223;
(Continued)

(56) References Cited

U.S. PATENT DOCUMENTS 6,230,138 B1 * 5/2001 Everhart ................. G10L 15/26
704/E15.044
7,487,084 B2 * 2/2009 Aaron ..................... G10L 15/01
704/251
(Continued)

*Primary Examiner* — Gerald Gauthier
(74) *Attorney, Agent, or Firm* — Morgan, Lewis & Bockius LLP

(57) ABSTRACT

The present disclosure relates to a method and a device for recognizing speech in a vehicle. The method for recognizing the speech in the vehicle may include collecting one or more types of information, determining information to be linked with each other for speech recognition based on an information processing priority predefined corresponding to each type of the collected information, analyzing the determined information to perform the speech recognition for a signal input through a microphone, and extracting at least one of a wake up voice or a command voice through the speech recognition to control the vehicle. Therefore, the present disclosure has an advantage of more accurately performing the speech recognition by linking collected various information in the vehicle with each other.

18 Claims, 6 Drawing Sheets

(51) Int. Cl.
*G06F 3/16* (2006.01)
*G06F 3/01* (2006.01)
*H04R 5/027* (2006.01)
*B60R 11/02* (2006.01)
*G06V 20/59* (2022.01)

(52) U.S. Cl.
CPC ............... *G06F 3/017* (2013.01); *G06F 3/16* (2013.01); *G06V 20/597* (2022.01); *G10L 25/51* (2013.01); *H04R 5/027* (2013.01); *H04R 2499/13* (2013.01)

(58) Field of Classification Search
CPC ..... G10L 15/01; G10L 15/083; G10L 15/193; G10L 15/24; G10L 15/26; G10L 25/60; H04R 1/406; H04R 5/027; H04R 2499/13; E05F 15/73; G01C 21/3629; G01C 21/3688; G06N 20/00
USPC .............................. 704/231, 270, 270.1, 275
See application file for complete search history.

(56) References Cited

U.S. PATENT DOCUMENTS

| | | | | |
|---|---|---|---|---|
| 7,822,613 B2* | 10/2010 | Matsubara | ............... | G10L 15/07 704/271 |
| 7,831,431 B2* | 11/2010 | Huang | ................... | G10L 15/28 704/246 |
| 8,190,434 B2* | 5/2012 | Kameyama | .......... | G08G 1/0962 704/270 |
| 8,447,598 B2* | 5/2013 | Chutorash | .......... | G01C 21/3688 455/563 |
| 8,532,989 B2* | 9/2013 | Funakoshi | ............ | G10L 15/083 704/235 |
| 8,762,852 B2* | 6/2014 | Davis | ................... | G06F 16/433 704/231 |
| 9,263,040 B2* | 2/2016 | Tzirkel-Hancock | .... | G10L 15/20 |
| 11,273,778 B1* | 3/2022 | Lakhani | .................. | G06N 20/00 |
| 2003/0023432 A1* | 1/2003 | Kyomitsu | ............... | G10L 15/20 704/231 |
| 2008/0071547 A1* | 3/2008 | Prieto | .................... | B60N 2/002 704/E15.021 |
| 2011/0131040 A1* | 6/2011 | Huang | ................ | B60R 16/0373 704/E21.001 |
| 2011/0202338 A1* | 8/2011 | Inghelbrecht | ......... | G10L 15/193 704/E15.001 |
| 2013/0268269 A1* | 10/2013 | Schalk | .................... | G10L 15/22 704/231 |
| 2014/0229174 A1* | 8/2014 | Graumann | ............. | G06V 40/28 704/231 |
| 2015/0006167 A1* | 1/2015 | Kato | ................... | G01C 21/3629 704/231 |
| 2015/0149164 A1* | 5/2015 | Oh | .......................... | G10L 15/20 704/231 |
| 2015/0187351 A1* | 7/2015 | Moon | ...................... | G10L 15/22 704/231 |
| 2015/0331664 A1* | 11/2015 | Osawa | ................. | G06F 3/04817 704/275 |
| 2015/0341005 A1* | 11/2015 | Talwar | ..................... | G10L 25/60 704/231 |
| 2015/0356971 A1* | 12/2015 | Stolcke | ................. | G06F 40/174 704/231 |
| 2016/0091967 A1* | 3/2016 | Prokofieva | .............. | G06F 3/013 345/156 |
| 2016/0098989 A1* | 4/2016 | Layton | .................... | G10L 15/20 704/231 |
| 2016/0176372 A1* | 6/2016 | Kim | ........................ | E05F 15/73 701/49 |
| 2018/0108368 A1* | 4/2018 | Gong | ........................ | G06F 9/46 |
| 2019/0189122 A1* | 6/2019 | Yokoyama | ............... | G10L 15/24 |
| 2019/0391640 A1* | 12/2019 | Prokofieva | ............... | G10L 17/22 |
| 2020/0160861 A1* | 5/2020 | Lee | ....................... | B60R 16/0373 |
| 2020/0219501 A1* | 7/2020 | Cartwright | ............ | G06F 3/0346 |
| 2021/0343275 A1* | 11/2021 | Lee | ......................... | G10L 15/20 |

* cited by examiner

METHOD AND DEVICE FOR RECOGNIZING SPEECH IN VEHICLE

CROSS-REFERENCE TO RELATED APPLICATION

The present application claims the benefit of priority to Korean Patent Application No. 10-2020-0052404, filed on Apr. 29, 2020 in the Korean Intellectual Property Office, the entire disclosure of which is incorporated herein by reference.

TECHNICAL FIELD

The present disclosure relates to speech recognition, and more particularly, relates to a method and a device for recognizing speech in a vehicle capable of improving a speech recognition performance in the vehicle.

BACKGROUND

A speech recognition technology is a technology of receiving and analyzing an uttered speech of a user and providing various services based on the analysis result.

As conventional representative speech recognition services, there are a speech-to-text conversion service that receives the uttered speech of the user, converts the uttered speech to a text, and outputs the text, a speech recognition-based virtual secretary service that provides various secretarial services by recognizing the uttered speech of the user, a speech recognition-based device control service that controls a corresponding electronic device by recognizing a control command from the uttered speech of the user, and the like.

Recently, a variety of speech recognition services that combine artificial intelligence with an IT technology are being released.

In a case of existing vehicles, a navigation, music, a phone call, air conditioning, lighting, and the like were mostly controlled through a button or a screen touch. However, as a traffic accident increases because of negligence in keeping eyes on a road during manipulation of the button or the screen touch, efforts are being continuously made to simplify vehicle control by the automakers.

Recently, research on a vehicle control technology through the speech recognition has been actively conducted.

A driver or a passenger of a conventional vehicle activated a speech recognition function through manipulation of a hardware push to talk button, a software key touch input, or the like.

Recently, a wake up voice-based speech recognition service that activates the speech recognition function through a speech of the user by replacing the physical button input has been generalized.

A wake up voice-based speech recognition performance may be evaluated largely by a function of normally performing a function suitable for a corresponding keyword when the keyword is spoken and a function of not performing any operation when the keyword is not spoken. For example, performing of an unwanted function by misrecognizing the keyword while the vehicle passenger has a general conversation in which the keyword is not included is a factor that significantly deteriorates the wake up voice-based speech recognition performance.

However, in a case of a vehicle with a conventional wake up voice-based speech recognition technology, accurate wake up voice recognition is difficult because of playback of a multimedia device such as radio broadcasting, the navigation, and the like, conversation between the driver and the passenger, vehicle environment noise during traveling, and the like, and a system frequently wakes up because of incorrect wake up voice recognition.

In addition, even after the speech recognition function is activated, a keyword spoken by the passenger is not able be accurately recognized because of the playback of the multimedia device, the vehicle environment noise, and the like.

SUMMARY

The present disclosure has been made to solve the abovementioned problems occurring in the prior art while advantages achieved by the prior art are maintained intact.

An aspect of the present disclosure provides a method and a device for recognizing speech in a vehicle.

Another aspect of the present disclosure provides a method and a device for recognizing speech in a vehicle capable of performing speech recognition using a peripheral device adaptively based on a vehicle environment in a vehicle equipped with a wake up voice-based speech recognition function.

Another aspect of the present disclosure provides a method for recognizing speech in a vehicle and a device and a system for the same capable of more accurately recognizing a wake up voice in a vehicle environment and providing an improved speech recognition performance.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a method for recognizing speech in a vehicle includes collecting one or more types of information in conjunction with one or more devices inside the vehicle, determining information to be linked with each other for speech recognition based on an information processing priority predefined corresponding to each type of the collected information, analyzing the determined information to perform the speech recognition for a signal input through a microphone, and extracting at least one of a wake up voice or a command voice through the speech recognition to control the vehicle.

In one embodiment, the one or more types of collected information may include at least one of speech information, vehicle information, image information, or sensing information.

In one embodiment, the vehicle may include a plurality of microphones, wherein a reliability of a speech recognition result performed through the microphones may be adjusted based on at least one of the one or more types of collected information.

In one embodiment, the method may further include determining a microphone to be activated for the speech recognition among the plurality of microphones based on the one or more types of collected information, and applying a weight to an input signal level of the activated microphone based on the one or more types of collected information.

In one embodiment, the plurality of microphones may be respectively arranged in seats in the vehicle, wherein the method may further include measuring input signal levels of the respective microphone, comparing the measured input signal levels with a predetermined threshold to determine a microphone to be used for the speech recognition, and activating the determined microphone as a speech recognition microphone.

In one embodiment, a weight may be assigned to an input signal level of the activated microphone based on information on whether each seat is occupied.

In one embodiment, the method may further include recognizing a driver's gaze based on the image information, calculating a coordinate corresponding to the recognized gaze, identifying a control target corresponding to the calculated coordinate, analyzing a microphone input speech corresponding to a time section where the gaze is recognized to extract the command voice, and determining whether the extracted command voice is a voice command applicable to the identified control target.

In one embodiment, the information processing priority may be adjusted and a vehicle control corresponding to the extracted command voice may be performed when the extracted command voice is the voice command applicable to the identified control target as a result of the determination.

In one embodiment, the sensing information may include at least one of gesture sensing information or rain sensing information.

In one embodiment, the method may further include analyzing the one or more types of collected information to adjust the information processing priority for each type of the collected information.

According to another aspect of the present disclosure, a device for recognizing speech in a vehicle includes an information collecting device for collecting one or more types of information in conjunction with one or more devices inside the vehicle, a status determining device for generating status information based on the one or more types of collected information, an information analyzing device for analyzing information to be used for the speech recognition based on an information processing priority for each type of the collected information, and a learning processing device for determining information to be linked with each other for the speech recognition based on the analyzed information and creating a scenario based on the determined linkage information to extract at least one of a wake up voice or a command voice, thereby controlling the vehicle.

In one embodiment, the one or more types of collected information may include at least one of speech information, vehicle information, image information, or sensing information.

In one embodiment, the vehicle may include a plurality of microphones, wherein a reliability of a speech recognition result performed corresponding to the microphones may be determined based on the one or more types of collected information.

In one embodiment, a microphone to be activated for the speech recognition may be determined among the plurality of microphones based on the one or more types of collected information, and wherein a weight may be applied to an input signal level of the activated microphone based on the one or more types of collected information.

In one embodiment, the plurality of microphones may be respectively arranged in seats in the vehicle, wherein input signal levels of the respective microphones may be measured, the measured input signal levels may be compared with a predetermined threshold to determine a microphone to be used for the speech recognition, and wherein the determined microphone may be activated as a speech recognition microphone.

In one embodiment, a weight may be assigned to an input signal level of the activated microphone based on information on whether each seat is occupied.

In one embodiment, a driver's gaze may be recognized based on the image information, wherein a coordinate corresponding to the recognized gaze may be calculated, wherein a control target corresponding to the calculated coordinate may be identified, wherein a microphone input speech corresponding to a time section where the gaze is recognized may be analyzed to extract the command voice, and wherein whether the extracted command voice is a voice command applicable to the identified control target may be determined.

In one embodiment, the information processing priority may be adjusted and a vehicle control corresponding to the extracted command voice may be performed when the extracted command voice is the voice command applicable to the identified control target as a result of the determination.

In one embodiment, the sensing information may include at least one of gesture sensing information or rain sensing information.

In one embodiment, the one or more types of collected information may be analyzed to adjust the information processing priority for each type of the collected information.

The technical problems to be solved by the present inventive concept are not limited to the aforementioned problems, and any other technical problems not mentioned herein will be clearly understood from the following description by those skilled in the art to which the present disclosure pertains.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
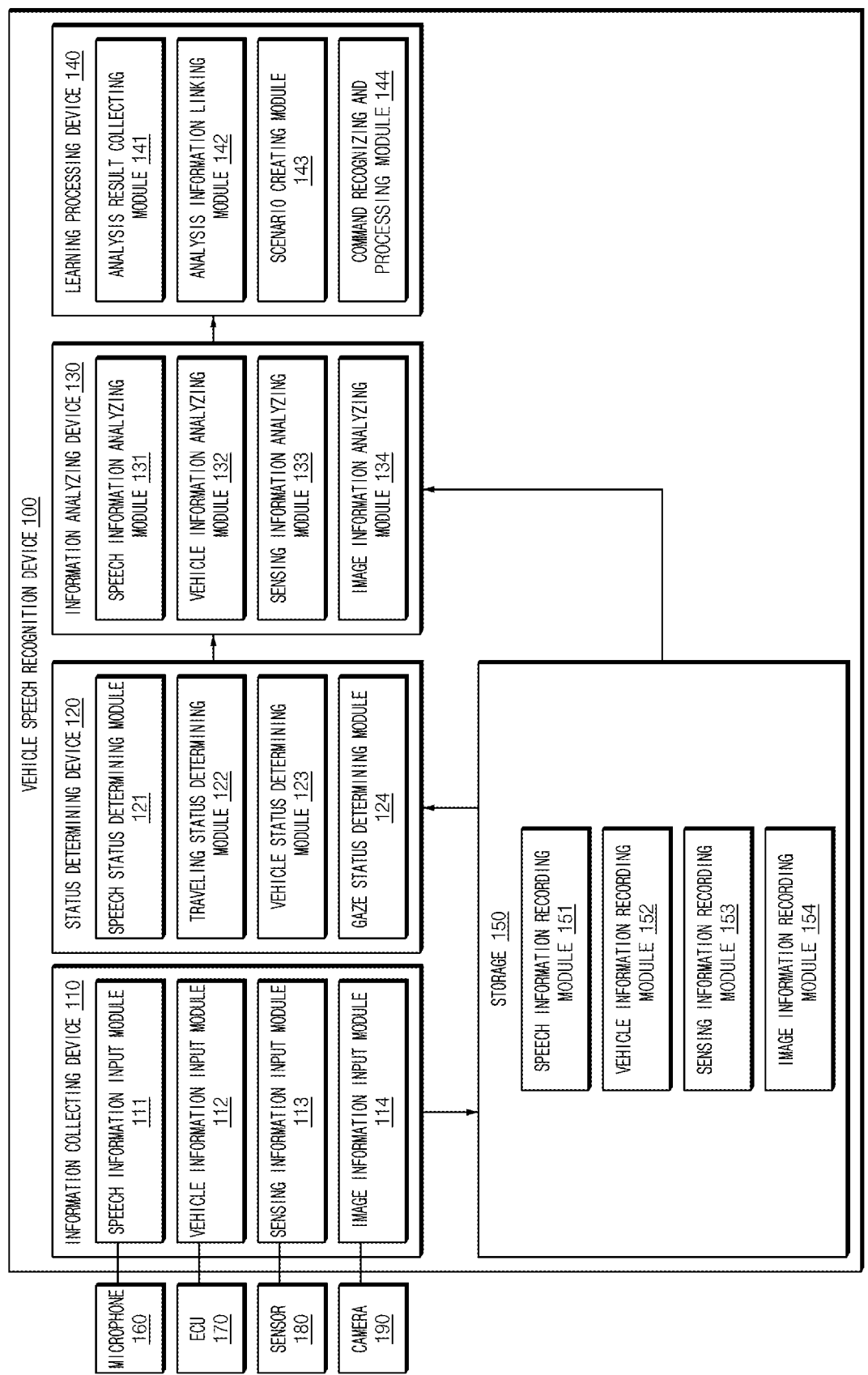
FIG. 1 is a block diagram for illustrating a structure of a vehicle speech recognition device according to an embodiment of the present disclosure.

Hereinafter, preferable embodiments of the disclosure will be described in detail with reference to the accompanying drawings. In adding the reference numerals to the components of each drawing, it should be noted that the identical or equivalent component is designated by the identical numeral even when they are displayed on other drawings. Further, in describing the embodiment of the disclosure, a detailed description of the related known configuration or function will be omitted when it is determined that it interferes with the understanding of the embodiment of the disclosure.

In describing the components of the embodiment according to the disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 6.

FIG. 1 is a block diagram for describing a structure of a vehicle speech recognition device according to an embodiment of the present disclosure.

Referring to FIG. 1, a vehicle speech recognition device 100 may roughly include an information collecting device 110, a status determining device 120, an information analyzing device 130, a learning processing device 140, and a storage 150.

The information collecting device 110 may include a speech information input module 111, a vehicle information input module 112, a sensing information input module 113, and an image information input module 114. A processor may perform various functions of following modules 111, 112, 113 and 114. The modules 111, 112, 113 and 114 described below are implemented with software instructions executed on the processor. The processor may embody one or more processor(s).

The speech information input module 111 of the information collecting device 110 may receive a speech signal input through at least one microphone 160 arranged in a vehicle. Each microphone 160 may be disposed in each seat. For example, the microphones 160 may include a driver's seat microphone, a passenger seat microphone, and at least one rear seat microphone. In one example, the speech information input module 111 may be communicatively connected to the at least one microphone 160.

The vehicle information input module 112 of the information collecting device 110 may receive various vehicle information from various electric control units (ECU) 170 arranged in the vehicle. In one example, the vehicle information input module 112 may be communicatively connected to the ECU(s) 170 of the vehicle.

For example, the vehicle information may include information on whether the vehicle is parked or stopped, traveling speed information, information on whether a window or a sunroof is opened, information on whether a wiper is driven, air conditioner operation status information, information on whether a seat is occupied, and the like, but may not be limited thereto.

In this connection, an air conditioner driving state may include information on a wind blowing intensity (level 1/level 2/level 3/ . . . ), a wind blowing direction (upper/middle/lower), and the like. Further, the air conditioner driving state may be used for analysis of noise input to each microphone disposed in each seat.

For example, when an air conditioning direction and a blowing intensity of a driver's seat are respectively the upper direction and a level equal to or higher than the level 3, reliability of speech information input to the microphone disposed in the driver's seat may be adjusted downward by a certain level.

For example, when a difference in reliability of speech recognition results for signals respectively input to the driver's seat microphone and the passenger seat microphone is within a reference range, a speech recognition result corresponding to a microphone less affected by the air conditioning may be used.

For example, when the sunroof and/or the window are open, the reliability of the speech information input through the microphone may be adjusted downward.

When the reliability of the speech information is equal to or below a reference value, speech-recognized wake up voice and/or command voice may be ignored by the vehicle.

The sensing information input module 113 of the information collecting device 110 may collect various sensing information from various sensors 180 arranged in the vehicle. For example, the sensing information may include rain (rainfall) sensing information measured by a rain sensor, gesture sensing information sensed by a gesture sensor, impact sensing information measured by an impact sensor, and the like, but may not be limited thereto. In one example, the sensing information input module 113 may be communicatively connected to the various sensors 180 of the vehicle.

The image information input module 114 of the information collecting device 110 may receive image information captured through at least one camera 190 disposed in the vehicle. In one example, the image information input module 114 may be communicatively connected to the at least one camera 190.

The information respectively collected by the speech information input module 111, the vehicle information input module 112, the sensing information input module 113, and the image information input module 114 may be respectively recorded and maintained in a speech information recording module 151, a vehicle information recording module 152, a sensing information recording module 153, and an image information recording module 154 of the storage 150. In one embodiment, each recording module 151, 152, 153 or 154 of the storage 150 may include various types of volatile or non-volatile storage media. For example, each recording module may include at least one type of storage medium among a flash memory type, a hard disk type, a multimedia card micro type such as an SD or XD memory, a random access memory (RAM), a static RAM (SRAM), a read-only memory (ROM), an electrically erasable programmable read-only memory (EEPROM), a programmable read-only memory (PROM), a magnetic memory, a magnetic disk, and an optical disk.

The status determining device 120 may determine various statuses based on the various information recorded in the storage 150.

In an embodiment, the status determining device 120 may include a speech status determining module 121, a traveling status determining module 122, a vehicle status determining module 123, and a gaze status determining module 124. A processor may perform various functions of following modules 121, 122, 123 and 124. The modules 121, 122, 123 and 124 described below are implemented with software instructions executed on the processor. The processor may embody one or more processor(s).

The speech status determining module 121 of the status determining device 120 may measure electrical strengths or levels of the signals input through the microphones 160 and may identify a location of a microphone where the strength or the level of the input signal is equal to or above a predetermined reference value. For example, when the input signal strength equal to or above the reference value is sensed, the speech status determining module 121 may determine the corresponding microphone as a speech recognition target microphone.

The traveling status determining module 122 of the status determining device 120 may determine whether the vehicle is stopped/parked/traveling based on the various information collected from the ECU 170 and may determine a current traveling speed when the vehicle is traveling. In this connection, the current traveling speed may be classified as a constant speed section. For example, a speed section may be classified into a low speed section (below 30 km/h), a medium speed section (equal to or above 30 km/h and below 60 km/h), a high speed section (equal to or above 60 km/h and below 90 km/h), and an ultra-high speed section (equal to or above 90 km/h), but may not be limited thereto.

The vehicle status determining module 123 of the status determining device 120 may determine the air conditioning direction and strength, whether the window is opened or closed, whether the sunroof is opened or closed, whether each seat is occupied, a rainfall condition, and the like based on the various information collected from the ECU 170. The vehicle status determining module 123 may monitor statuses of items that affect a speech recognition rate in real time.

The gaze status determining module 124 of the status determining device 120 may recognize a gaze status of a driver based on the image information captured by the camera 190. For example, the gaze status determining module 124 may recognize whether the driver is staring at a specific location inside the vehicle for a certain time.

The information analyzing device 130 may perform detailed information analysis based on the various status determination results of the status determining device 120.

In an embodiment, the information analyzing device 130 may include a speech information analyzing module 131, a vehicle information analyzing module 132, a sensing information analyzing module 133, and an image information analyzing module 134. A processor may perform various functions of following modules 131, 132, 133 and 134. The modules 131, 132, 133 and 134 described below are implemented with software instructions executed on the processor. The processor may embody one or more processor(s).

The speech information analyzing module 131 of the information analyzing device 130 may compare an input level for each microphone location with a predetermined threshold to identify and activate the microphone to be used for the speech recognition.

The vehicle information analyzing module 132 of the information analyzing device 130 may determine a weight for each microphone input level based on the vehicle status information such as the information on whether each seat is occupied and the like. For example, a weight assigned to an input level of a microphone disposed in an occupied seat may be higher than a weight assigned to an input level of a microphone disposed in an unoccupied seat.

The speech information analyzing module 131 may process the speech recognition based on the determined weight.

In this connection, a speech recognition procedure may include (a) extracting the speech signal and/or characteristics of the speech signal from a corresponding microphone input signal, (b) analyzing a meaning, that is, a word, a sentence, and the like based on the extracted speech signal and/or speech characteristics, and (c) extracting the wake up voice and/or the command voice based on the analyzed meaning.

The sensing information analyzing module 133 of the information analyzing device 130 may dynamically control reliabilities of the speech information and the sensing information based on the gesture sensing information, the rain sensing information, and the like.

For example, the sensing information analyzing module 133 may adjust a priority weight of the speech information based on the sensing information. For example, when the priority weight adjusted for the speech information is equal to or below a predetermined reference value, use of the speech information may be excluded and a control command of a user may be recognized based on the sensing information and/or the image information. The sensing information according to the embodiment may include the rain sensing information, and the priority weight for the speech information may be dynamically adjusted based on whether it rained and a change in an amount and rainfall. In this connection, information having a high priority weight may be preferentially used to determine the control command of the user. For example, a plurality of information with priority weights equal to or higher than a certain level may be linked with each other and then utilized in determining the control command of the user. In another embodiment, information with a priority weight equal to or lower than the certain level may be excluded and not utilized in the determining of the control command of the user.

The image information analyzing module 134 of the information analyzing device 130 may recognize the gaze of the user and analyze what function the driver is staring based on recognized gaze information.

The image information analyzing module 134 may be linked to the speech information analyzing module 131 to improve the reliabilities of the speech information and the image information.

For example, when a gaze of the driver for controlling the vehicle or controlling a system equipped in the vehicle, for example, an AVN (Audio Video Navigation), the image information analyzing module 134 may be linked with the speech information analyzing module 131 to analyze a speech input corresponding to a section in which a corresponding gaze is recognized, thereby analyzing whether the speech of the user is a general conversation speech or a voice command.

The learning processing device 140 may determine linkage information based on the information analysis result of the information analyzing device 130 and create a scenario based on the determined linkage information to finally recognize the vehicle control command of the user.

The learning processing device 140 according to the embodiment may include an analysis result collecting module 141, an analysis information linking module 142, a scenario creating module 143, and a command recognizing and processing module 144. A processor may perform various functions of following modules 141, 142, 143 and 144. The modules 141, 142, 143 and 144 described below are implemented with software instructions executed on the processor. The processor may embody one or more processor(s).

The analysis result collecting module 141 of the learning processing device 140 may collect analysis information for each information type from the information analyzing device 130.

The analysis information linking module 142 of the learning processing device 140 may determine which information to link with each other based on the collected analysis information. For example, a speech information analysis result and a vehicle information analysis result may be linked with each other. In another example, the speech information analysis result and an image information analysis result may be linked with each other. In another example, the speech information analysis result and a sensing information analysis result may be linked with each other. In another example, the analysis results for at least one of the speech information, the image information, or the sensing information may be adaptively linked based on the vehicle information analysis result.

The analysis information linking module 142 may dynamically determine a linkage target based on a preset information processing priority and whether the analysis information exists.

The scenario creating module 143 of the learning processing device 140 may create the scenario for the user control command determination based on the determined linkage target.

The command recognizing and processing module 144 of the learning processing device 140 may recognize the user control command based on the determined scenario and start or control corresponding device and/or system based on the recognized control command.

Figure 2:
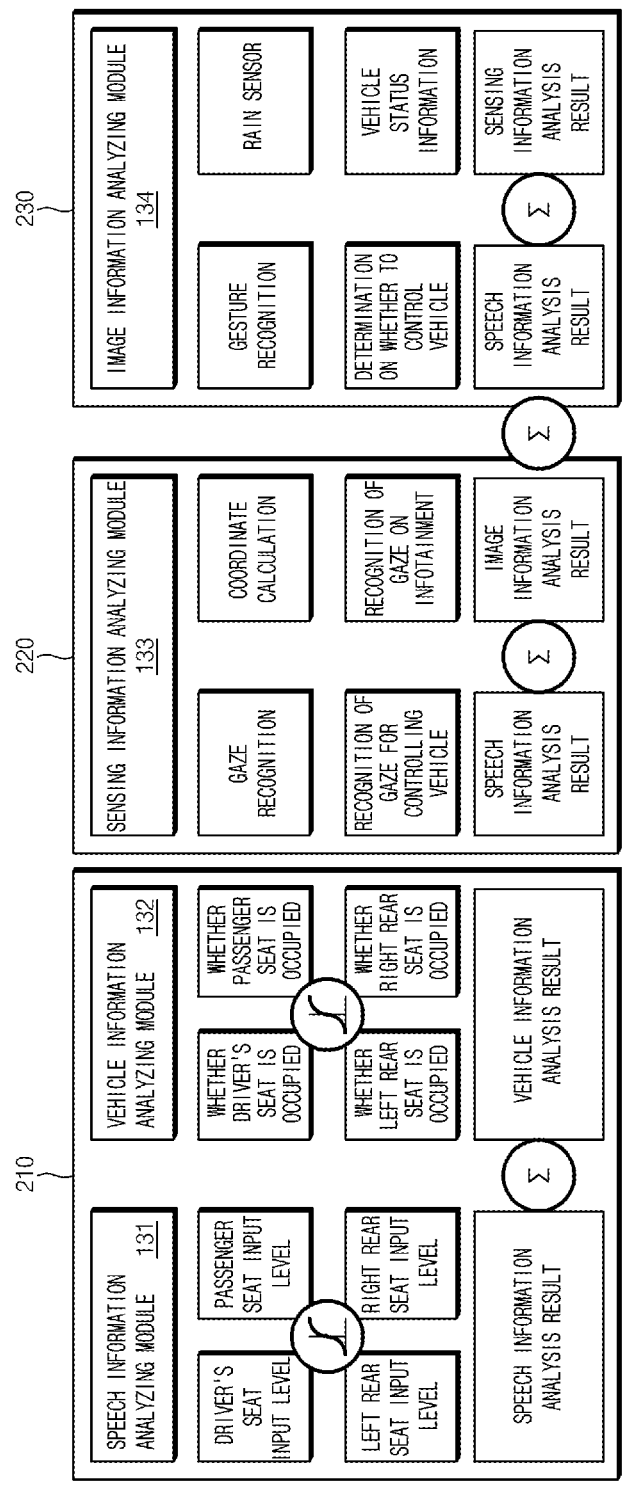
FIG. 2 is a diagram illustrating a procedure of recognizing a control command of a user in a vehicle speech recognition device according to an embodiment of the present disclosure.

FIG. 2 is a diagram illustrating a procedure of recognizing a control command of a user in a vehicle speech recognition device according to an embodiment of the present disclosure.

Referring to FIG. 2, each information type may have the preset information processing priority.

For example, the information processing priority may be defined to be high in an order of the speech information>the vehicle information>the image information>the sensing information, but this is only one embodiment. Thus, the information processing priority may be differently defined and applied based on a design of a person skilled in the art.

Referring to a reference numeral 210, the speech information analysis result calculated by the speech information analyzing module 131 and the vehicle information analysis result calculated by the vehicle information analyzing module 132 may be linked with each other to perform speech recognition process. That is, a speech recognition process may be performed by assigning the weight to the input level for each microphone based on the speech input level for each seat and whether the driver is on board.

For example, speech input levels of microphones respectively arranged in the driver's seat, the passenger seat, and left and right rear seats are equal to or above the threshold, the speech information analyzing module 131 may activate input speech analysis, and the vehicle information analyzing module 132 may assign the weights of the input levels by utilizing whether each seat is occupied.

Referring to a reference numeral 220, the speech information analysis result calculated by the speech information analyzing module 131 and the image information analysis result calculated by the image information analyzing module 134 may be linked with each other to additionally analyze whether the input speech signal is the general conversation speech or the voice command.

For example, the image information analyzing module 134 may identify which function of the vehicle, for example, an infotainment function, an air conditioning function, and the like the driver is staring utilizing the user's gaze information and may analyze whether the input speech signal is the general conversation speech or the voice command utilizing the identified gaze recognition information and the speech information.

Referring to a reference numeral 230, the speech information analysis result calculated by the speech information analyzing module 131 and the sensing information analysis result calculated by the sensing information analyzing module 133 may be linked with each other to assign a weight for speech recognition analysis information.

For example, the sensing information analyzing module 133 may improve the reliabilities of the speech information and the sensing information utilizing the gesture recognition information, the rain sensing information, and the like.

For example, the amount of rainfall may be measured based on a sensing value of the rain sensor, and the weight for the speech recognition analysis information may be dynamically adjusted based on the measured amount of rainfall. In this connection, the higher the weight, the more important the speech recognition analysis information may be utilized to determine the user control command.

In an embodiment, the linkage result of the reference numeral 220 and the linkage result of the reference numeral 230 may be linked with each other again to be utilized in determining the control command of the user.

In an embodiment, the vehicle speech recognition device 100 may adaptively utilize the speech information/the image information/the sensing information based on the vehicle information and the predefined information processing priority to improve a speech recognition rate and/or a user control command recognition rate.

Figure 3:
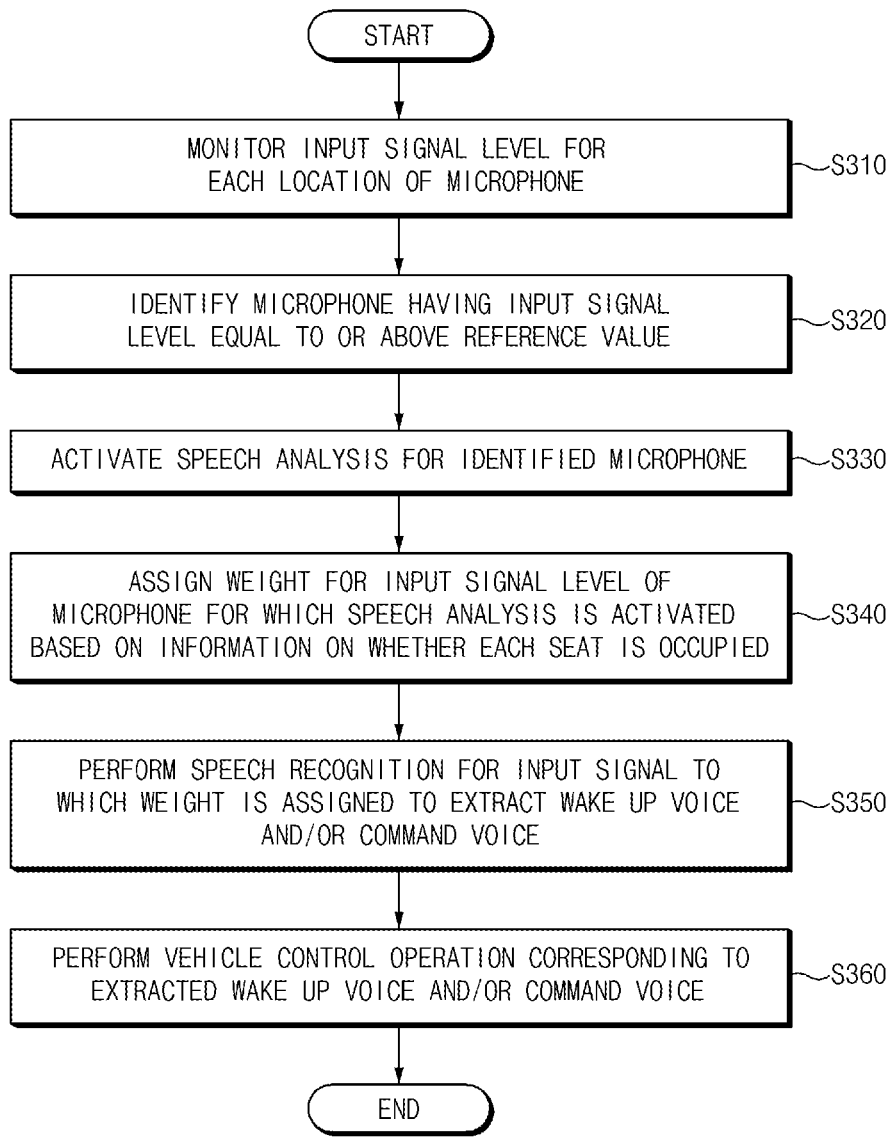
FIGS. 3 to 6 are flowcharts for describing a vehicle speech recognition method according to embodiments of the present disclosure.

FIG. 3 is a flowchart for describing a vehicle speech recognition method according to an embodiment of the present disclosure.

Specifically, FIG. 3 illustrates an exemplary method for performing the speech recognition by linking the speech information with the vehicle information.

Hereinafter, for convenience of a description, terms of the vehicle speech recognition device 100 and the device 100 will be interchangeably used.

Referring to FIG. 3, the device 100 may monitor the input signal level for each location of the microphone disposed in the vehicle (S310).

The device 100 may identify the microphone having the input signal level equal to or above the reference value (S320).

The device 100 may activate analysis of the speech signal input to the identified microphone (S330).

The device 100 may assign the weight for the input signal level of the microphone for which the speech analysis is activated based on the information on whether each seat is occupied (S340).

The device 100 may perform the speech recognition for the microphone input signal to which the weight is assigned to extract the wake up voice and/or the command voice (S350).

The device 100 may control a vehicle control operation corresponding to the extracted wake up voice and/or command voice to be performed (S360).

Figure 4:
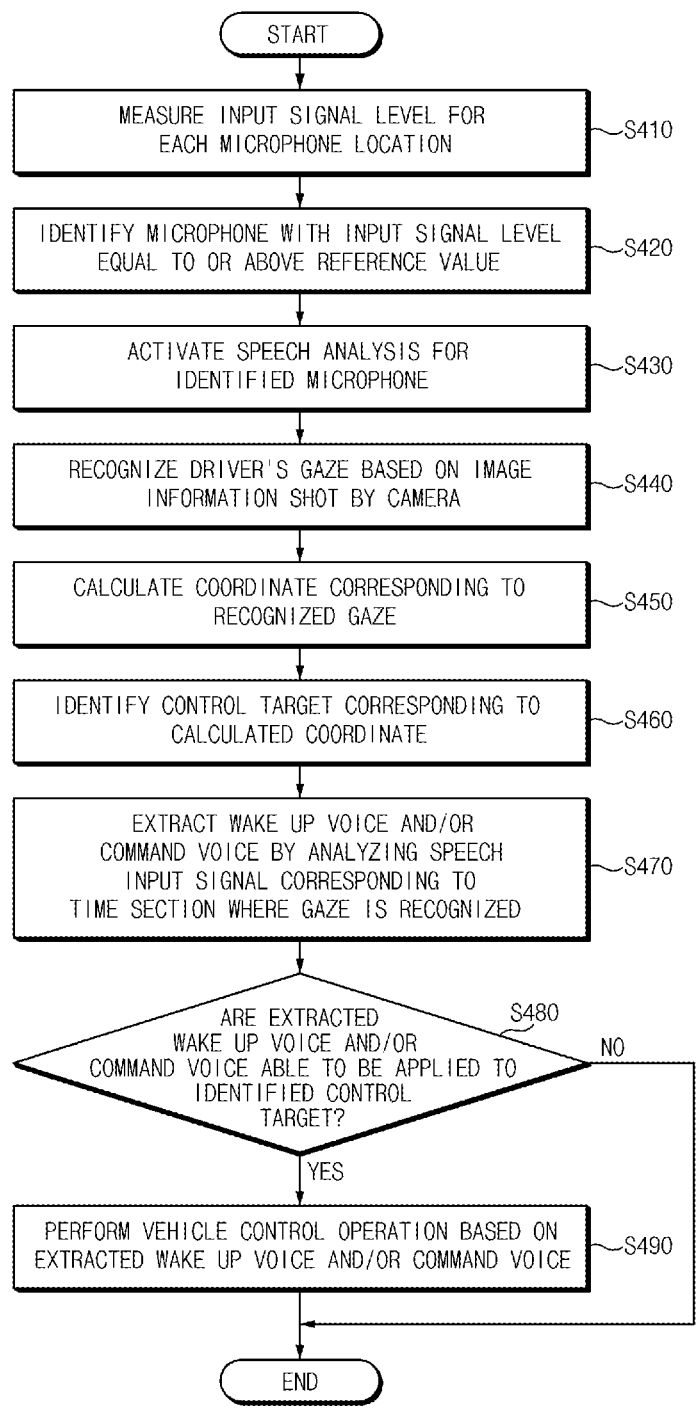

FIG. 4 is a flowchart for describing a vehicle speech recognition method according to another embodiment of the present disclosure.

Referring to FIG. 4, the device 100 may measure the input signal level for each microphone location (S410).

The device 100 may identify the microphone with the input signal level equal to or above the reference value (S420).

The device 100 may activate the speech analysis for the identified microphone (S430).

Because the speech recognition is performed by activating only the necessary microphone through operations 410 to 430, there is an advantage of preventing malfunction resulted from overload and incorrect speech recognition of the device 100 in advance through unnecessary speech analysis.

For example, when speech signal levels input through two microphones among the plurality of microphones arranged in the vehicle are equal to or above the predetermined threshold and a difference between the input signal levels of the two microphones is within a range of tolerance, the device 100 may determine validity of the two microphone inputs based on information other than speech information, for example, at least one of the vehicle information, the image information, or the sensing information.

For example, the device 100 may assign priorities to the microphone input signals based on the gesture recognition information, the gaze recognition information, or the like.

The device 100 may recognize the driver's gaze based on the image information captured by the camera (S440).

The device 100 may calculate a coordinate corresponding to the recognized gaze (S450).

The device 100 may identify a control target corresponding to the calculated coordinate (S460).

For example, the control target may include the infotainment (AVN), a cluster, various control buttons arranged in the vehicle, and the like, but may not be limited thereto.

The device 100 may extract the wake up voice and/or the command voice by analyzing a speech input signal corresponding to a time section where the gaze is recognized (S470).

The device 100 may determine whether the extracted wake up voice and/or command voice are able to be applied to the identified control target (S480).

When the extracted wake up voice and/or command voice are able to be applied as the result of the determination, the device 100 may perform the vehicle control operation based on the extracted wake up voice and/or command voice (S490).

When the extracted wake up voice and/or command voice are not able to be applied as the result of the determination, the device 100 may determine the extracted wake up voice and/or command voice as the general conversation speech and may not perform the vehicle control operation.

Figure 5:
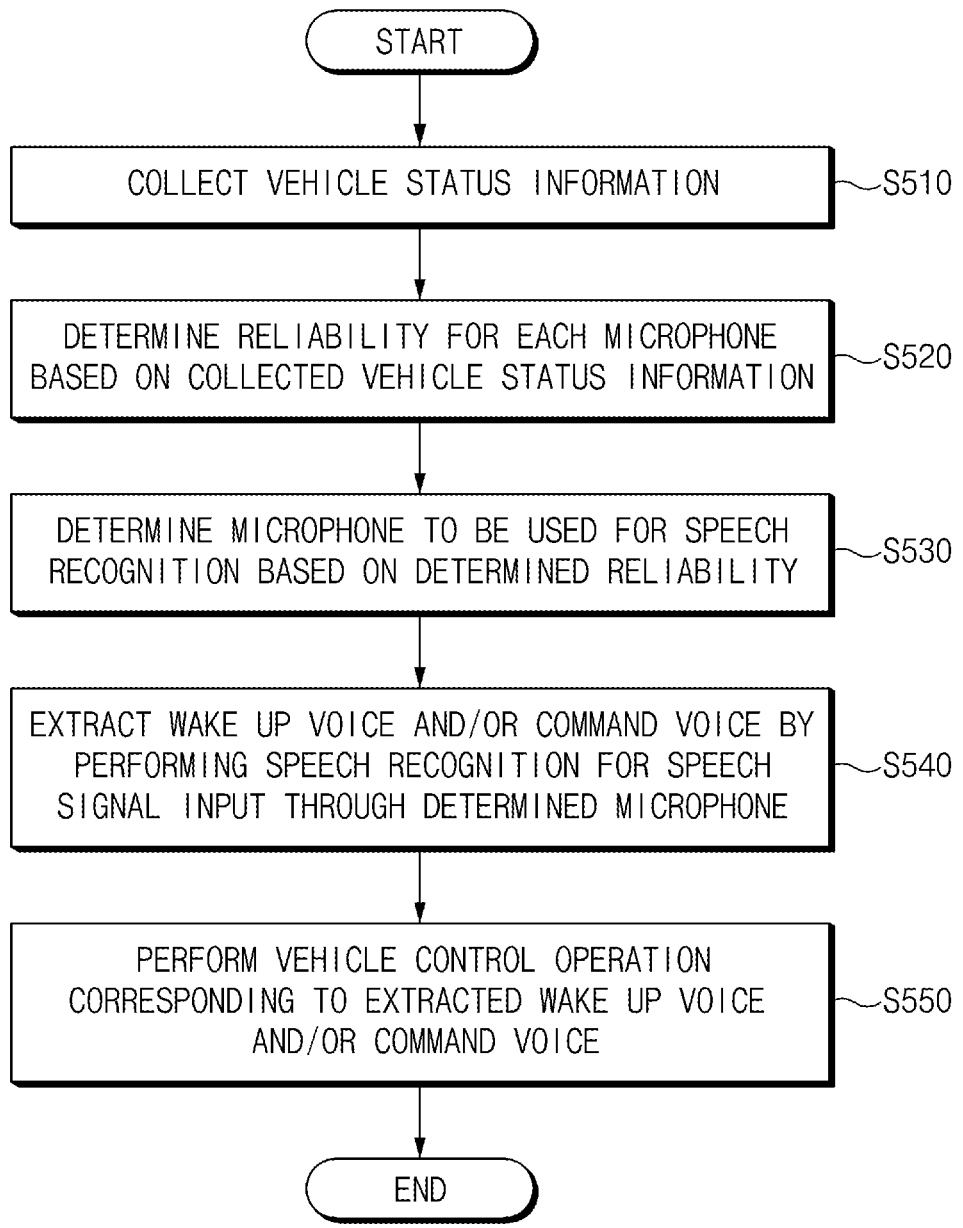

FIG. 5 is a flowchart for describing a vehicle speech recognition method according to another embodiment of the present disclosure.

Referring to FIG. 5, the device 100 may collect the vehicle status information (S510). In this connection, the vehicle status information may be the information on whether each seat is occupied, but may not be limited thereto.

The device 100 may determine a reliability for a microphone disposed in each seat based on the collected vehicle status information (S520). For example, a reliability of the microphone corresponding to the occupied seat may be determined to be higher than a reliability of the microphone corresponding to the unoccupied seat. In an embodiment, the device 100 may determine the microphone reliability further based on the preset priority for each seat. For example, the priority may be given to be high in an order of the driver's seat>the passenger seat>the rear seat. That is, when people are seated on the driver's seat and the passenger seat, the microphone disposed in the driver's seat may be determined to have a higher reliability than the microphone located in the passenger seat.

The device 100 may determine the microphone to be used for the speech recognition based on the determined reliability (S530).

The device 100 may extract the wake up voice and/or the command voice by performing the speech recognition for the speech signal input through the determined microphone (S540).

The device 100 may perform the vehicle control operation corresponding to the extracted wake up voice and/or command voice (S550).

Figure 6:
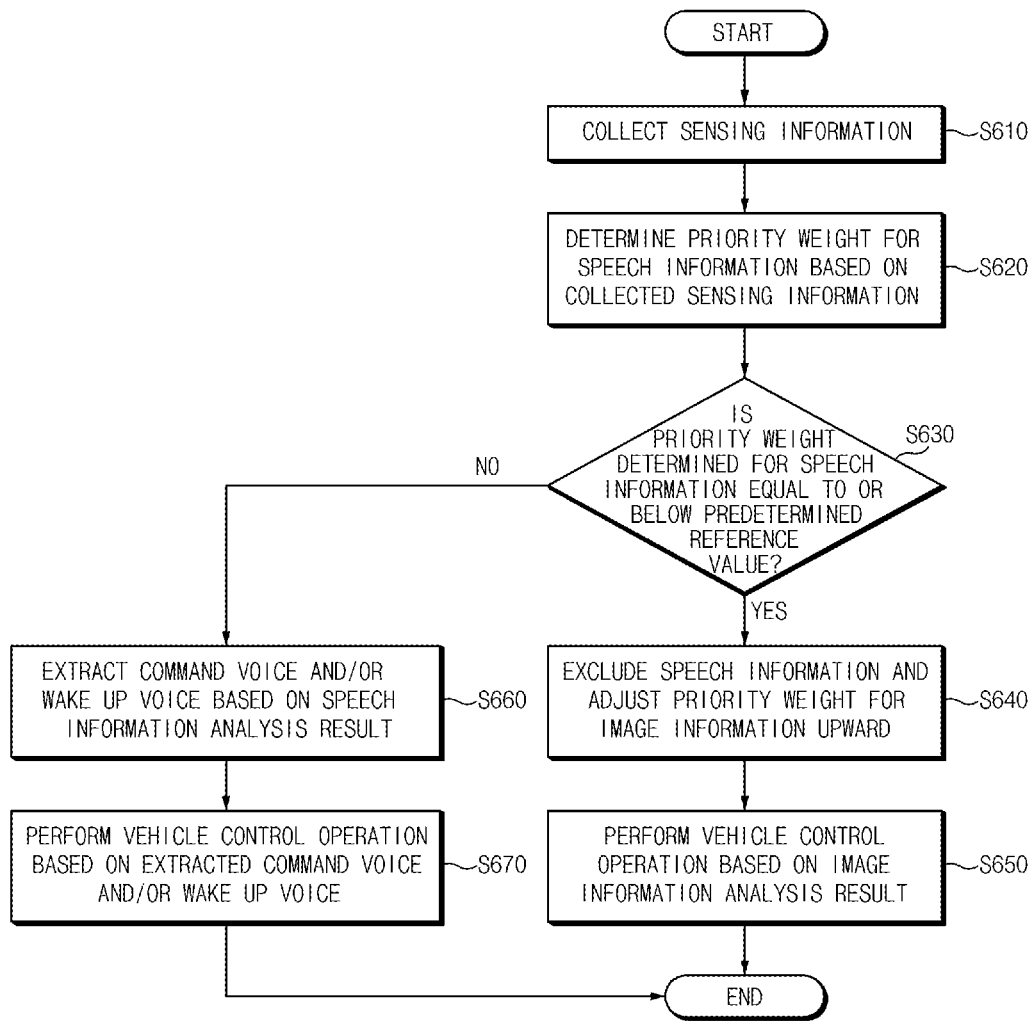

FIG. 6 is a flowchart for describing a vehicle speech recognition method according to another embodiment of the present disclosure.

Referring to FIG. 6, the device 100 may collect the sensing information from the various sensors mounted in the vehicle (S610).

The device 100 may determine the priority weight for the speech information based on the collected sensing information (S620).

The device 100 may determine whether the priority weight determined corresponding to the speech information is equal to or below the predetermined reference value (S630).

When the priority weight for the speech information is equal to or below the reference value as the result of the determination, the device 100 may exclude the speech information and adjust a priority weight for the image information upward (S640).

The device 100 may analyze the image information as the priority weight for the image information is adjusted upward, identify the user's control command based on the image information analysis result, and perform the vehicle control operation based on the identified control command (S650).

When the priority weight for the speech information is above the reference value as the result of the determination in operation 630, the device 100 may analyze the speech information and extract the command voice and/or the wake up voice based on the speech information analysis result (S660).

The device 100 may perform the vehicle control operation based on the extracted command voice and/or the wake up voice (S670).

Hereinafter, an example of creating the scenario based on the collected information in the device 100 will be briefly described.

When an output of an audio device such as a radio, a navigation, and the like is input through the plurality of microphones arranged in the vehicle in a state in which the rest of the seats other than the driver's seat are not unoccupied, the device 100 according to the embodiment may recognize the wake up voice through the plurality of microphones. In this case, the device 100 may determine the corresponding wake up voice as a result of misrecognition resulted from ambient noise, that is, false wakeup. That is, sound coming from the media, the radio, and the like is input at similar levels to the plurality of microphones, so that the wake up voice may be recognized by all the microphones at the same time. Accordingly, when the same wake up voice and/or command voice is recognized by all the microphones at the same time, the device 100 may determine that the corresponding wake up voice and/or command voice is misrecognized.

The driver may utter the predetermined vehicle control command in a state in which all the seats are occupied and the window is opened. When the speech recognition reliability is below the reference value because of the external noise, the recognized command voice may be automatically processed as being misrecognized. However, when the speech recognition reliability is equal to or below the reference value because of the external noise, the device 100 according to the present disclosure may additionally analyze the sensing information and/or the image information to prevent the control command uttered by the driver in advance from being determined as being misrecognized.

For example, when it is recognized that the driver is staring at the infotainment or is performing a specific gesture, the speech recognition reliability value may be improved to normally recognize the command uttered by the driver.

As described above, the vehicle speech recognition device 100 according to the present disclosure may dynamically determine the information to be linked with each other based on the collected various information, dynamically create the scenario based on the determined linkage information, and then analyze the scenario, thereby more accurately recognizing the control command of the user.

The operations of the method or the algorithm described in connection with the embodiments disclosed herein may be embodied directly in hardware or a software module executed by a processor, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM.

The exemplary storage medium is coupled to the processor, which may read information from, and write information to, the storage medium. In another method, the storage medium may be integral with the processor. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The present disclosure has the advantage of providing the method and the device for recognizing the speech in the vehicle.

In addition, the present disclosure has the advantage of providing the method and the device for recognizing the speech in the vehicle capable of performing the speech recognition using the peripheral device adaptively based on the vehicle environment in the vehicle equipped with the wake up voice-based speech recognition function.

In addition, the present disclosure has the advantage of providing the method for recognizing the speech in the vehicle and the device and the system for the same capable of more accurately recognizing the wake up voice in the vehicle environment and providing the improved speech recognition performance.

In addition, various effects that may be directly or indirectly identified through this document may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for recognizing speech in a vehicle, the method comprising:
    collecting one or more types of information in conjunction with one or more devices inside the vehicle, the one or more types of collected information including image information;
    determining information to be linked with each other for speech recognition based on an information processing priority predefined corresponding to each type of the collected information;
    analyzing the determined information to perform the speech recognition for a signal input through a microphone;
    extracting at least one of a wake up voice or a command voice through the speech recognition to control the vehicle;
    recognizing a driver's gaze based on the image information;
    calculating a coordinate corresponding to the recognized gaze;
    identifying a control target corresponding to the calculated coordinate;
    analyzing a microphone input speech corresponding to a time section where the gaze is recognized to extract the command voice; and
    determining whether the extracted command voice is a voice command applicable to the identified control target.

2. The method of claim 1, wherein the one or more types of collected information further include at least one of speech information, vehicle information, or sensing information.

3. The method of claim 2, wherein the vehicle includes a plurality of microphones,
    wherein a reliability of a speech recognition result performed through the microphones is adjusted based on at least one of the one or more types of collected information.

4. The method of claim 3, further comprising:
    determining a microphone to be activated for the speech recognition among the plurality of microphones based on the one or more types of collected information; and
    applying a weight to an input signal level of the activated microphone based on the one or more types of collected information.

5. The method of claim 2, wherein the plurality of microphones are respectively arranged in seats in the vehicle, and
    wherein the method further includes:
    measuring input signal levels of the respective microphones;
    comparing the measured input signal levels with a predetermined threshold to determine a microphone to be used for the speech recognition; and
    activating the determined microphone as a speech recognition microphone.

6. The method of claim 5, wherein a weight is assigned to an input signal level of the activated microphone based on information on whether each seat is occupied.

7. The method of claim 1, wherein the information processing priority is adjusted and a vehicle control corresponding to the extracted command voice is performed when the extracted command voice is the voice command applicable to the identified control target as a result of the determination.

8. The method of claim 2, wherein the sensing information includes at least one of gesture sensing information or rain sensing information.

9. The method of claim 8, further comprising:
analyzing the one or more types of collected information to adjust the information processing priority for each type of the collected information.

10. A device for recognizing speech in a vehicle, the device comprising:
an information collecting device configured to collect one or more types of information in conjunction with one or more devices inside the vehicle, the one or more types of collected information including image information;
a status determining device configured to generate status information based on the one or more types of collected information;
an information analyzing device configured to analyze information to be used for speech recognition based on an information processing priority for each type of the collected information; and
a learning processing device configured to determine information to be linked with each other for the speech recognition based on the analyzed information and to create a scenario based on the determined linkage information to extract at least one of a wake up voice or a command voice, thereby controlling the vehicle,
wherein a driver's gaze is recognized based on the image information,
wherein a coordinate corresponding to the recognized gaze is calculated,
wherein a control target corresponding to the calculated coordinate is identified,
wherein a microphone input speech corresponding to a time section where the gaze is recognized is analyzed to extract the command voice, and
wherein whether the extracted command voice is a voice command applicable to the identified control target is determined.

11. The device of claim 10, wherein the one or more types of collected information further include at least one of speech information, vehicle information, or sensing information.

12. The device of claim 11, wherein the vehicle includes a plurality of microphones,
wherein a reliability of a speech recognition result performed corresponding to the microphones is determined based on the one or more types of collected information.

13. The device of claim 12, wherein a microphone to be activated for the speech recognition is determined among the plurality of microphones based on the one or more types of collected information, and
wherein a weight is applied to an input signal level of the activated microphone based on the one or more types of collected information.

14. The device of claim 11, wherein the plurality of microphones are respectively arranged in seats in the vehicle,
wherein input signal levels of the respective microphones are measured,
wherein the measured input signal levels are compared with a predetermined threshold to determine a microphone to be used for the speech recognition, and
wherein the determined microphone is activated as a speech recognition microphone.

15. The device of claim 14, wherein a weight is assigned to an input signal level of the activated microphone based on information on whether each seat is occupied.

16. The device of claim 11, wherein the information processing priority is adjusted and a vehicle control corresponding to the extracted command voice is performed when the extracted command voice is the voice command applicable to the identified control target as a result of the determination.

17. The device of claim 11, wherein the sensing information includes at least one of gesture sensing information or rain sensing information.

18. The device of claim 17, wherein the one or more types of collected information is analyzed to adjust the information processing priority for each type of the collected information.

* * * * *